United States Patent [19]

Mund, Jr.

[11] Patent Number: 5,309,712
[45] Date of Patent: May 10, 1994

[54] SOLID FUEL ROCKET MOTOR SEALS

[76] Inventor: Charles J. Mund, Jr., 215 Main Ave., Clarks Summit, Pa. 18411

[21] Appl. No.: 695,605

[22] Filed: May 3, 1991

[51] Int. Cl.$^5$ ............................................. F02K 9/00
[52] U.S. Cl. ...................................... 60/253; 60/255; 60/271
[58] Field of Search .................... 60/253, 255, 271; 102/374

[56] References Cited

U.S. PATENT DOCUMENTS

| | | | |
|---|---|---|---|
| 2,421,752 | 6/1947 | Jones | 102/38 |
| 2,856,851 | 10/1958 | Thomas | 60/253 |
| 2,956,401 | 10/1960 | Kane | 60/35.6 |
| 2,990,684 | 7/1961 | Cohen | 60/35.6 |
| 3,015,209 | 1/1962 | Geckler | 60/35.6 |
| 3,027,709 | 4/1962 | Welder | 60/255 |
| 3,099,959 | 8/1963 | Bowersett | 102/49 |
| 3,188,802 | 6/1965 | Davies | 60/35.6 |
| 3,270,668 | 9/1966 | Silver | 102/20 |
| 3,296,802 | 1/1967 | Williams | 60/256 |
| 3,691,770 | 9/1972 | Nunn | 60/271 |
| 3,713,386 | 1/1973 | Zaid | 102/38 |
| 3,720,167 | 3/1973 | Mainhardt et al. | 102/34.4 |
| 3,754,507 | 8/1973 | Dillinger et al. | 102/374 |
| 3,786,633 | 1/1974 | Worcester et al. | 60/255 |
| 4,104,969 | 8/1978 | Moll | 102/49.3 |
| 4,127,243 | 11/1978 | Jacobson et al. | 244/3.21 |
| 4,936,092 | 6/1990 | Andrew | 60/253 |
| 4,967,599 | 11/1990 | Donguy | 60/271 |
| 5,036,658 | 8/1991 | Tate | 60/253 |

OTHER PUBLICATIONS

Journal of the Tripoli Rocketry Association, Inc. Tripolitan, vol. 5 No. 4, Feb. 1991, back page advertisement "RMS Reloadable Motor System" Schematic drawing of Reloadable Motor by Industrial Solid Propulsion 1 page.

*Primary Examiner*—Richard A. Bertsch
*Assistant Examiner*—Howard R. Richman
*Attorney, Agent, or Firm*—Christie, Parker & Hale

[57] ABSTRACT

A rocket motor has a reloadable, reusable hollow casing which contains solid fuel, a nozzle and preferably a delay ignition cartridge and ejection charge. A nozzle gasket holds the nozzle in place at the exhaust end of the casing and a delay cartridge gasket holds the delay cartridge and ejection charge in place at the ejection charge end of the casing. The gaskets fit loosely against the casing and are deformable so that upon ignition they are pressed outward against removable flanges at each end of the casing to create a seal against the casing.

3 Claims, 2 Drawing Sheets

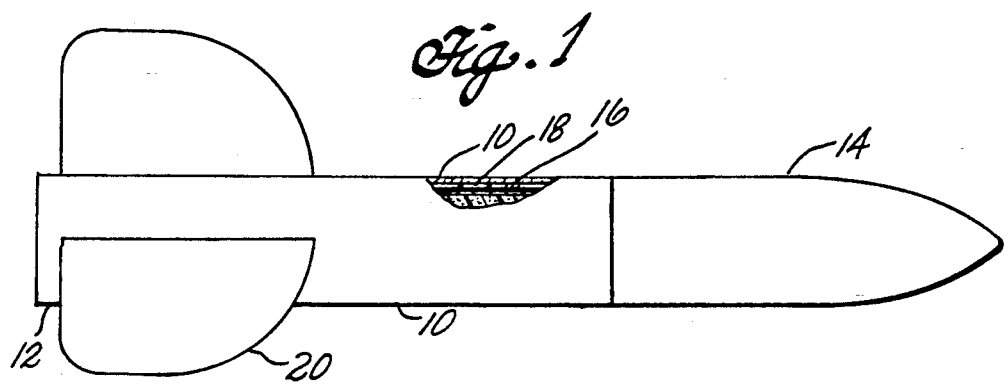
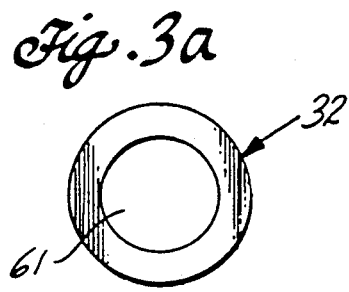
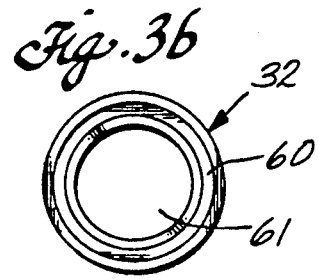
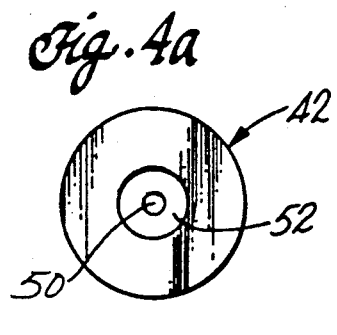
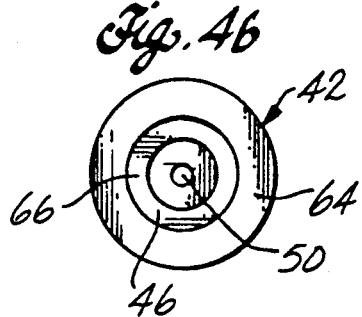

SOLID FUEL ROCKET MOTOR SEALS

FIELD OF THE INVENTION

The present invention pertains to the field of rocket motor seals, and in particular to deformable gaskets for a reusable solid fuel rocket motor casing which both holds key components in place and seals the ends of the rocket motor casing.

BACKGROUND OF THE INVENTION

Solid fuel rocket motors with a range of up to several hundred miles are typically used by hobbyists and for low altitude scientific research, for example, weather measurements. They will typically employ a solid fuel rocket motor which has an exhaust nozzle at one end, and an ejection charge at the other end. The solid fuel propellant is between these two ends. It is currently known to use an aluminum cylindrical casing for the rocket motor housing, which is then stocked with a series of cylindrical solid fuel cartridges which contain the propellant. It is important in such a motor casing to seal the two ends of the tube, first, to prevent combustion gases from being exhausted out the ejection charge end of the casing and, second, to force the combustion gases which are exhausted out the exhaust end of the casing to exit out the exhaust nozzle and not around the sides. Rubber O-rings which are deformed when the components of the rocket motor are assembled are typically used. In some cases, an end cap is screwed onto each of the ends of the cylindrical hollow rocket motor casing. When the end caps are screwed down, O-ring gaskets, either in the casing or in the end caps are pressed longitudinally to form a seal against the casing. An alternative method is to use O-rings which are compressed radially. Typically, the O-rings will be stretched over a portion of the threaded end caps and have a larger outside diameter than the inside diameter of the motor casing. The gaskets are therefore compressed when pushed into the hollow cylindrical casing. They can then be held in place longitudinally in a variety of ways.

In addition to fuel cartridges and end seals, a rocket motor also requires holders for the exhaust nozzle delay ignition cartridge and ejection charge. These parts are all typically provided separately further complicating the assembly of the rocket motor with its many parts and seals. Since it is preferred to reuse a rocket motor retaining all of the holders and gaskets and replacing the spent fuel cartridges, delay ignition cartridge and ejection charge, the time consumed and the inconvenience of disassembling and reassembling the motor is important.

SUMMARY OF THE INVENTION

The present invention provides a rocket motor which is quick and easy to assemble and disassemble, and requires a minimum number of parts, reducing the expense effort and time required for its use.

In one embodiment, in a rocket motor having an outer substantially cylindrical hollow casing for containing at least one fuel cartridge and a nozzle for directing combustion gases generated by the fuel cartridge out an exhaust end of the casing, the invention encompasses a deformable rubber nozzle or delay cartridge gasket. The gasket has a cylindrical exterior for sealing against the casing interior, and an inner bore adapted to receive at least a portion of the nozzle or delay cartridge. The bore is adapted to maintain the nozzle or cartridge in place with respect to the casing interior during use of the motor.

In another embodiment, in a rocket motor having a substantially cylindrical hollow casing with at least one open end, a fuel cartridge within the casing, and a flange proximate the open end, the invention encompasses a deformable gasket having a first surface for engaging the flange, and a second opposite surface facing the fuel cartridge. When the motor is in use, combustion gases produced by the fuel cartridge press upon the gasket between the first and second surfaces so that the gasket is deformed and seals against the casing interior.

BRIEF DESCRIPTION OF THE DRAWINGS

These and other aspects of the invention will be more fully understood by referring to the following detailed description and the accompanying drawings wherein:

FIG. 1 shows a solid fuel rocket incorporating the motor of the present invention partially cut away;

FIG. 3A is an outside end view of a nozzle gasket according to the present invention;

FIG. 3B is an inside end view of the gasket of FIG. 3A;

FIG. 4A is an outside end view of a delay cartridge gasket according to the present invention; and FIG. 4B is an inside end view of the gasket of FIG. 4A.

DETAILED DESCRIPTION OF THE INVENTION

Figure 2:
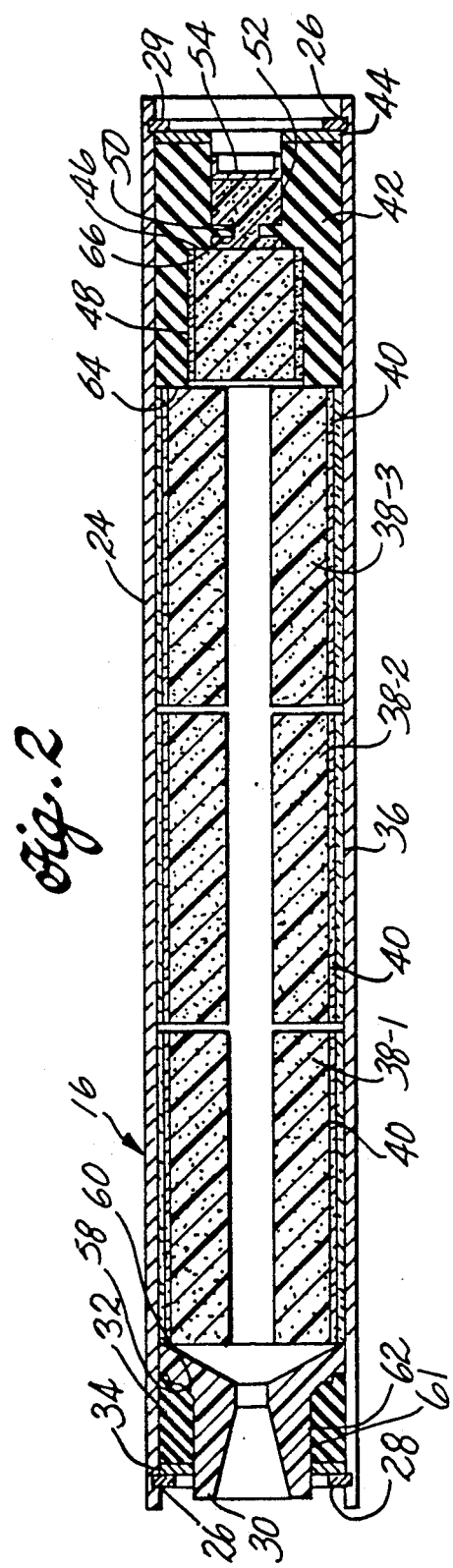
FIG. 2 is a cross-sectional view of a rocket motor incorporating the present invention.

The present invention encompasses a solid fuel rocket motor intended for use in a variety of different rockets. Typically, such a rocket will be used by hobbyists or for launching lightweight scientific equipment into the lower atmospheres up to a distance of several hundred miles. Such a rocket is shown, for example, in FIG. The rocket has a fuselage 10 with a base 12 and a nose cone 14. The motor 16 is housed within the fuselage and held in place by an insulating layer 18. A set of fins 20 are mounted at the base 12. The nose cone 14 typically contains a parachute or other recovery device, and may also contain a variety of instrumentation or measurement equipment.

FIG. 2 shows a rocket motor constructed according to the principles of the present invention. The motor is enclosed in a casing 24. The casing is preferably constructed of a hollow cylindrical aluminum tube which is open at both ends. The tube has an interior circumferential groove 26 at each end for retaining preferably steel snap rings 28, 29. The snap ring holds the other components of the rocket motor in place after the motor has been assembled. An exhaust nozzle 30 is mounted at the exhaust end of the casing. The nozzle may be of any conventional construction, and is typically constructed of a carbon fiber or heat resistant plastic material. The nozzle has a frusto-conical outer surface 58 which leads to a cylindrical portion 62. The nozzle is mounted in a silicon rubber gasket 32 which is held in place by a steel washer 34 that butts against the snap ring 28. The frusto-conical portion of the nozzle mates with a similarly frusto-conical portion 60 of the gasket, and the cylindrical portion 62 of the nozzle fits into a cylindrical portion of the gasket. Together, the frusto-conical and cylindrical portions of the gasket form an inner bore 61.

Adjacent the nozzle is an insulating cylindrical paper liner 36 which contains a set of conventional cylindrical solid fuel propellant cartridges or grains 38-1, 38-2, 38-3. Each fuel cartridge is constructed in a paper liner 40 and has a central bore through its middle. Other fuel cartridge designs may also be used. The propellant cartridges are held at one end where they butt up against the nozzle 30, and at the other end where they butt up against a second gasket 42. This gasket, the ejection charge or delay ignition cartridge gasket, is in contact with a second annular washer 44 which butts against the second snap ring 29. The second gasket has a cylindrical recess 46 which is adapted to hold a cylindrical delay ignition cartridge 48. The recess 46 is in communication with a passageway 50 through the gasket which ends at a cup 52 at the opposite side of the gasket. When the motor is assembled, the cup is filled with an ejection charge 53, typically in the form of a loose powder, which is then held in place with a retaining cap 54.

The rocket motor is assembled by inserting the nozzle 30 into the nozzle gasket, and inserting the delay cartridge 48 into the delay cartridge gasket 42. The gaskets, washers, fuel cartridges, and paper liner are then inserted into the casing to the configuration shown in FIG. 2, and the snap rings 28 are locked into the grooves 26. The motor casing is then held with the delay cartridge facing upward, and an ejection charge is poured into the cup in the delay cartridge gasket. The ejection charge fills the cup and the passageway to come into direct contact with the delay cartridge. The retaining cap is then slipped into place in the cup over the ejection charge, and the rocket motor is ready for use. After the motor has been used, the fuel cartridges, delay cartridge, and ejection charge will be spent. The motor is disassembled by removing one of the snap rings and pulling the gaskets out of the casing. For reuse, new fuel cartridges, a delay cartridge and an ejection charge are then loaded into the casing, the gaskets are replaced in the casing with their washers and the snap rings locked back into place. The motor is then ready for the next flight.

It is preferred that the gaskets 32,42 have a substantially cylindrical exterior surface which matches the interior shape of the aluminum casing, with about the same diameter as the inside diameter of the casing. It is also preferred that the delay cartridge and nozzle fit snugly into their respective gaskets so that the gaskets are deformed slightly when the delay cartridge and nozzle are inserted into their respective gaskets. This allows the delay cartridge and nozzle to be held securely in their appropriate positions, but allows the gaskets to easily be inserted and removed from the casing. For additional ease, it is preferred that a silicon grease, for example, Dow-Corning Model 111, be applied to the silicon, gaskets before inserting them into the aluminum casing. The gaskets are preferably each made from a single piece of silicon rubber, however, a variety of other materials can be used. It is preferred that the gasket material be heat resistant to withstand the high temperatures within the rocket motor when in use, as well as deformable and substantially incompressible.

In use, the rocket motor is started using a conventional ignition device. This starts combustion in the fuel cartridges 38-1,38-2,38-3. The burning fuel cartridges quickly ignite the delay ignition cartridge. As the fuel cartridges burn, they produce combustion gases at a high heat and pressure which are exhausted out the nozzle 30 to power the rocket. The pressure of the combustion gases pushes the nozzle towards the open exhaust end of the casing at which it is mounted, at the exhaust end of the casing. As shown in FIG. 2, the nozzle has a frusto-conical surface 58 which contacts a frusto-conical surface 60 on the gasket as the combustion gases push the nozzle toward the exhaust end of the casing. These surfaces contact, pressing the gasket against the washer 34. The washer's actual travel is, however, limited by the snap ring 28. The gasket has a flat annular surface which contacts the washer. As a result, the gasket is pressed between the washer and the frusto-conical surface of the nozzle. This deforms the gasket so that it presses against the cylindrical portion of the nozzle 62 and the inside wall of the casing 24. The gasket thereby forms a tight seal against the casing because of the pressure of the combustion gases within the casing. This tight seal forces all the combustion gases which exit out the exhaust end of the casing to exit through the nozzle.

Similarly, the pressure of the combustion gases push also against the delay cartridge gasket. The delay cartridge gasket has a first annular surface 64 adjacent the fuel cartridges, and a second annular surface 66 adjacent the passageway filled with ejection charge. The combustion gases push against the first annular surface and also against the delay ignition charge, which pushes against the second annular surface, pressing the gasket against its annular washer 44, which is locked in place by the snap ring 29. This gasket also has an annular surface which presses against the washer. Like the nozzle gasket, the delay cartridge gasket is preferably substantially incompressible and expands radially as it is deformed by the pressure, forming a tight seal against the interior of the casing and against the outside of the delay charge. This seal prevents any combustion gases from escaping out the top or ejection end of the casing.

The delay ignition charge burns much more slowly than the fuel cartridges. The purpose of the delay ignition charge is to effect a time delay between the exhaustion the fuel cartridges and ignition of the ejection charge 53. After the delay cartridge is substantially spent, normally a few seconds after the fuel cartridges are consumed, it will ignite the ejection charge held by the delay cartridge gasket. The ejection charge then burns very quickly, throwing off the retaining cup and activating a parachute mechanism. As the fuel cartridges are burning, pressing the delay cartridge axially towards the ejection end of the casing, the delay cartridge is pressed against the annular surface of the delay cartridge gasket within the recess that holds the delay cartridge. This pressure further prevents exhaust gases from leaking around the delay cartridge and igniting the ejection charge prematurely. However, the radial expansion of the gasket between the casing and the delay cartridge caused by pressure against the first annular surface should prevent exhaust gases from ever reaching the second annular surface.

For ease of installation, it is preferred that the fuel cartridges and gaskets fit into the casing with loose contact against the casing interior. When the motor is at rest, the gaskets preferably will form only a weak seal against the interior of the casing. However, very soon after ignition, after pressures inside the casing have built up, the gaskets will be pressed axially towards their respective ends away from the fuel cartridges and tightly seal against the surfaces which they contact. The gaskets, therefore, achieve a seal which is much tighter than conventional gaskets because it is developed by the very high pressures inside the combustion chamber interior of the casing, rather than mechanical pressure applied by screw-on fittings. In addition, since, for example, the nozzle gasket not only seals the exhaust end of the casing, but also holds the nozzle in position, there is no need for any additional parts to hold the nozzle. The delay cartridge gasket not only seals the ejection end of the casing, but also holds the delay cartridge in its proper position with respect to the fuel cartridges and holds the ejection charge against the delay cartridge, eliminating an even larger number of parts which are typically used to hold the delay cartridge and ejection charge. The gasket also eliminates the separate 0-rings which seal the delay cartridge into its recess and its holder and seal the delay cartridge and ejection charge holders against the interior of the casing.

The frusto-conical surface 60 of the inner bore 61 of the nozzle gasket 32 is shown in elevation in FIGS. 3A and 3B. FIGS. 4A and 4B depict in elevation view the relative positions of the recess 46, cup 52 and passageway 50 in the delay cartridge gasket 42.

A great variety of modifications and adaptations are possible to the embodiment described above without departing from the spirit and scope of the present invention. For example, a great variety of different stops may be used at the open ends of the casing. Snap rings are presently preferred for small-diameter motor casings. Snap rings, together with the washers, provide a flange against which the gaskets abut when they are pressed outward. For larger diameter motor casings, threaded end caps are preferred. These threaded caps preferably would screw onto each end of the casing with external threads and present an annular flange, which would serve the same purpose as the end washers 34, 44. Alternatively, shear or set pins, lock wires, or any other type of end stop can be used. In addition, it is not necessary that an ejection charge and delay cartridge be used. A variety of different parachute or recovery devices can be used, activated either by a delay cartridge or by some other means. The ejection charge need not necessarily be retained by the delay cartridge gasket, but instead could be provided, for example, in a screw-on end cap. The casing 24 need not be cylindrical; a variety of elliptical or angular elongated hollow shapes can be used, for example, rectangular or hexagonal. The term "substantially cylindrical" as used in the claims below is intended to encompass such other elongated shapes. The particular shape of the gaskets may be altered to match different casings, nozzles, delay cartridges and ejection charges. The casing can be made of materials other than aluminum. Other ductile metals or fiberglass reinforced plastics, for example, can be used. The motor casing 24 can be inserted into an insulated housing, as shown in FIG. 1, or can be used as a rocket fuselage in and of itself. The motor can be used either alone or in combination with other motors to power different types of rockets. By describing only one embodiment and a few variations thereon, it is not intended to limit the scope of the invention, which should be limited only by the claims below.

What is claimed is:

1. In a rocket motor having an outer hollow casing with a substantially cylindrical interior for containing at least one fuel cartridge and a nozzle for directing combustion gasses generated by the fuel cartridge out an exhaust end of the casing, a deformable rubber nozzle gasket comprising a cylindrical exterior for sealing against the casing interior and an inner bore adapted to receive at least a portion of the nozzle, the inner bore being adapted to maintain the nozzle in place with respect to the casing interior during use of the motor, said inner bore having a cylindrical portion for receiving a cylindrical portion of the nozzle and a frusto-conical portion adjacent the cylindrical portion for receiving a frusto-conical portion of the nozzle.

2. A rocket motor comprising:
   a hollow casing with a substantially cylindrical interior and having an exhaust end, the casing including an interior circumfrential groove proximate the exhaust end;
   a removable snap ring received within the groove and engaging a washer on a first side, the washer and snap ring constituting a flange proximate the exhaust end;
   a fuel cartridge within the casing;
   a nozzle proximate the casing exhaust end for conducting combustion gasses generated by the fuel cartridge out the casing exhaust end; and
   a deformable rubber nozzle gasket having a cylindrical exterior surface for engaging the casing interior and an inner bore for receiving and engaging an exterior surface of the nozzle and further having a surface for engaging a second side of the washer, thereby preventing the nozzle gasket from exiting the casing exhaust end.

3. A rocket motor comprising:
   a hollow casing with a substantially cylindrical interior and having an exhaust end;
   a fuel cartridge within the casing;
   a nozzle proximate the casing exhaust end for conducting combustion gasses generated by the fuel cartridge out the casing exhaust end, the nozzle having an exterior surface comprising a frusto-conical section which decreases in diameter with distance toward the casing exhaust end; and
   a deformable rubber nozzle gasket for holding the nozzle in place within the casing, the nozzle gasket having a cylindrical exterior surface for engaging the casing interior and an inner bore having a frusto-conical surface adapted to match the nozzle frusto-conical section exterior surface for receiving and engaging the exterior surface of the nozzle.

* * * * *